(12) United States Patent
Nakayama

(10) Patent No.: US 8,915,124 B2
(45) Date of Patent: Dec. 23, 2014

(54) SURFACE TEXTURE MEASURING APPARATUS

(75) Inventor: Tatsuki Nakayama, Hiroshima (JP)

(73) Assignee: Mitutoyo Corporation, Kanagawa (JP)

( * ) Notice: Subject to any disclaimer, the term of this patent is extended or adjusted under 35 U.S.C. 154(b) by 223 days.

(21) Appl. No.: 13/400,893

(22) Filed: Feb. 21, 2012

(65) Prior Publication Data

US 2012/0227476 A1  Sep. 13, 2012

(30) Foreign Application Priority Data

Mar. 9, 2011  (JP) .................. 2011-051366

(51) Int. Cl.
  *G01B 5/28*  (2006.01)
  *G01B 5/016* (2006.01)
  *G01B 21/30* (2006.01)
  *G01B 5/20*  (2006.01)
  *G01B 21/20* (2006.01)

(52) U.S. Cl.
  CPC ............... *G01B 5/016* (2013.01); *G01B 21/30* (2013.01); *G01B 5/28* (2013.01); *G01B 5/20* (2013.01); *G01B 21/20* (2013.01)
  USPC .................. 73/105; 73/104; 33/554

(58) Field of Classification Search
  USPC ............ 73/105, 53.06, 1.89, 405; 33/501.04, 33/551–561
  See application file for complete search history.

(56) References Cited

U.S. PATENT DOCUMENTS

| | | | |
|---|---|---|---|
| 5,983,713 A * | 11/1999 | Matsuzaki ................ | 73/105 |
| 6,295,866 B1 * | 10/2001 | Yamamoto et al. ........ | 73/105 |
| 6,360,176 B1 * | 3/2002 | Nishioki et al. ............ | 702/56 |
| 7,039,550 B2 * | 5/2006 | Noda ........................ | 702/168 |
| 7,631,548 B2 * | 12/2009 | Baba et al. ................ | 73/105 |
| 8,161,657 B2 * | 4/2012 | Yamamoto et al. ........ | 33/561 |
| 2005/0011078 A1 * | 1/2005 | Kubota ...................... | 33/551 |

(Continued)

FOREIGN PATENT DOCUMENTS

| JP | 58-083201 A | 5/1983 |
|---|---|---|
| JP | 2004-354289 A | 12/2004 |
| WO | 2007/097135 | 8/2007 |

OTHER PUBLICATIONS

U.S. Appl. No. 13/429,679 to Tatsuki Nakayama et al., which was filed Mar. 26, 2012.

(Continued)

*Primary Examiner* — Peter Macchiarolo
*Assistant Examiner* — Anthony W Megna Fuentes
(74) *Attorney, Agent, or Firm* — Greenblum & Bernstein, P.L.C.

(57) ABSTRACT

A surface texture measuring apparatus includes a stylus displacement detector having a measurement arm which is able to swing, a pair of styli provided at a tip of the measurement arm, and a detection unit configured to detect swing amounts of the measurement arm, a stage configured to mount the subject of measurement thereon, and a relative movement mechanism configured to cause a relative movement between the detector and the stage. The apparatus includes a posture switching mechanism configured to switch a posture of the measurement arm between a posture in which the measurement arm is urged in one swing direction and a posture in which the measurement arm is urged in the other swing direction, and a speed control mechanism configured to control a switching speed of posture switching of the measurement arm to a preset speed when the posture of the measurement arm is switched by the posture switching mechanism.

6 Claims, 11 Drawing Sheets

(56) References Cited

U.S. PATENT DOCUMENTS

| | | |
|---|---|---|
| 2006/0191329 A1* | 8/2006 | Adderton et al. ............... 73/105 |
| 2008/0106307 A1* | 5/2008 | Lee et al. ...................... 327/110 |
| 2009/0249867 A1 | 10/2009 | Takanashi |
| 2011/0088273 A1* | 4/2011 | Yamamoto et al. ............. 33/561 |
| 2011/0138895 A1 | 6/2011 | Yamada et al. |

OTHER PUBLICATIONS

Japan Office action, dated Sep. 2, 2014 along with an English translation thereof.

* cited by examiner

SURFACE TEXTURE MEASURING APPARATUS

CROSS REFERENCE TO RELATED APPLICATION(S)

This application is based upon and claims the benefit of priority from Japanese Patent Application No. 2011-051366 flied on Mar. 9, 2011, the entire contents of which are incorporated herein by reference.

TECHNICAL FIELD

The present invention relates to a surface texture measuring apparatus. More specifically, the invention relates to a surface texture measuring apparatus having a stylus which is brought into contact with a surface of a subject of measurement.

RELATED ART

Surface texture measuring apparatus are known which move a stylus along a surface of a subject of measurement with the stylus kept in contact with the surface, detects displacements of the stylus that are caused by a surface shape, surface roughness, or the like of the subject of measurement, and recognizes a surface texture such as a surface shape, surface roughness, or the like of the subject of measurement based on the detected displacements of the stylus.

Usually, a surface texture measuring apparatus is equipped with a detector having a measurement arm which is supported so as to be able to swing about an axis of rotation (supporting point), a stylus provided at the tip of the measurement arm, and a detection unit for detecting swing amounts of the measurement arm. The surface texture measuring apparatus is also equipped with a stage to be mounted with a subject of measurement and a relative movement mechanism for causing a relative movement between the detector and the stage.

The detection unit detects swing amounts of the measurement arm while the relative movement mechanism causes a relative movement between the detector and the stage with the stylus kept in contact with a surface of the subject of measurement. A surface texture of the subject of measurement is recognized based on the detected swing amounts.

To measure, for example, a top inner surface and a bottom inner surface of a cylindrical work using a surface texture measuring apparatus of the above kind, it is necessary to perform a measurement on the bottom inner surface of the cylindrical work by attaching an arm having a downward-directed stylus at the tip to a detector body, then remove the arm and redirect the stylus upward, and finally perform a measurement on the top inner surface of the cylindrical work by attaching the arm to the detector body again. The measurements take long time because the arm needs to be removed and attached again.

In view of the above, a surface texture measuring apparatus has been proposed which is configured so as to be able to measure a top inner surface and a bottom inner surface of a cylindrical work without the need for removing and again attaching a measurement arm (refer to Patent document 1).

In this surface texture measuring apparatus, an upward stylus and a downward stylus are provided at the tip of a measurement arm. A top inner surface of a cylindrical work is measured with the tip of the measurement arm urged upward, and then a top inner surface of the cylindrical work is measured by switching the posture of the measurement arm so that its tip is urged downward.

PRIOR ART REFERENCE

Patent Documents

[Patent document 1] JP-A-58-83201

However, in the above conventional surface texture measuring apparatus, almost no friction occurs between the measurement arm and the axis of rotation so that the stylus can follow a surface shape or the like of a subject of measurement. This results in a problem that as shown in FIG. 11 the stylus 26A or 26B may collide with a subject of measurement W during a switching operation of the measurement arm 24 to damage the tip of the stylus 26A or 26B or the subject of measurement W.

SUMMARY

Exemplary embodiments of the invention provide a surface texture measuring apparatus in which a stylus or a subject of measurement is hardly damaged even if the posture of the measurement arm is switched in measuring an inner surface of a hole.

A surface texture measuring apparatus according to the invention is a surface texture measuring apparatus for measuring a surface texture of a subject of measurement based on swing amounts of a measurement arm, the apparatus comprising:

a detector having the measurement arm supported so as to be able to swing with an axis of rotation as a supporting point, and a detection unit configured to detect the swing amounts of the measurement arm;

a posture switching mechanism configured to switch a posture of the measurement arm between a posture in which the measurement arm is urged in one swing direction and a posture in which the measurement arm is urged in the other swing direction; and a speed control mechanism configured to control a switching speed of posture switching of the measurement arm to a preset speed when the posture of the measurement arm is switched by the posture switching mechanism.

The surface texture measuring apparatus may further comprise:

a stage configured to mount the subject of measurement thereon; and a relative movement mechanism configured to cause a relative movement between the detector and the stage, wherein:

the detector has a pair of styli projecting from a tip of the measurement arm in a swing direction of the measurement arm, and the detection unit detects the swing amounts of the measurement arm while the relative movement mechanism causes a relative movement between the detector and the stage in a state that one of the pair of styli is in contact with a surface of the subject of measurement.

With this configuration, to measure an inner surface of a hole, first, the posture of the measurement arm is switched by the posture switching mechanism so that the tip of the measurement arm is urged in one swing direction, whereby one of the pair of styli is brought into contact with the inner surface of the hole.

For example, where the measurement arm is supported so as to be able to swing in the vertical direction with its axis of rotation as a supporting point, the posture of the measurement arm is switched by the posture switching mechanism so that the tip of the measurement arm is urged upward in the swing direction, whereby one of the pair of styli (e.g., upward stylus) is brought into contact with a top surface of the hole. In this state, as the relative movement mechanism causes a relative movement between the detector and the stage in the axial direction of the hole, the detection unit detects swing amounts of the measurement arm. A surface texture of the top surface of the hole is recognized based on the detected swing amounts.

Then, to measure a bottom surface of the hole, the posture of the measurement arm is switched by the posture switching mechanism so that the tip of the measurement arm is urged in the other swing direction (downward), whereby the other of the pair of styli (e.g., downward stylus) is brought into contact with the bottom surface of the hole. When the posture of the measurement arm is switched, that is, when its urging direction is changed from the one direction (upward) to the other direction (downward), the switching speed of the posture switching of the measurement arm is controlled to a preset speed by the speed control mechanism. Since the switching speed of the measurement arm can be made lower than or equal to a prescribed speed, the impact that occurs when each stylus collides with the inner surface of the hole (measurement subject) can be suppressed and hence the damage of each stylus and the subject of measurement can be made small.

Then, as the relative movement mechanism causes a relative movement between the detector and the stage in the axial direction of the hole, the detection unit detects swing amounts of the measurement arm. A surface texture of the bottom surface of the hole is recognized based on the detected swing amounts.

In the surface texture measuring apparatus, the detection unit may comprise a position detector disposed along a swing range of the measurement arm, configured to output pulse signals corresponding to the swing amounts of the measurement arm, the posture switching mechanism may comprise a voice coil configured to urge the measurement arm in the one swing direction or the other swing direction with the axis of rotation as the supporting point, and the speed control mechanism may comprise a speed detector configured to detect the switching speed of the measurement arm based on the pulse signals supplied from the position detector, a signal generator configured to generate an instruction speed signal indicating an instruction speed corresponding to a switching direction, a difference output module configured to output a difference between the instruction speed and the switching speed, and a constant current circuit configured to generate a current to flow through the voice coil based on the difference supplied from the difference output module.

With this configuration, when the urging direction of the tip of the measurement arm is switched from one swing direction to the other by the relative movement mechanism, pulse signals are output from the position detector corresponding to a swing amount of the measurement arm. The speed detector detects a switching speed of the measurement arm based on the pulse signals supplied from the position detector. A difference between the detected switching speed and an instruction speed indicated by an instruction speed signal supplied from the signal generator is determined, and the current to flow through the voice coil is controlled based on the determined difference. In this manner, the switching speed of the measurement arm can be kept equal to the instruction speed indicated by the instruction speed signal that is output from the signal generator. Since the switching speed of the measurement arm can be kept at an arbitrary instruction speed, it can be set at a speed that is suitable for the material of a subject of measurement and other factors.

Furthermore, since the speed control mechanism uses pulse signals supplied from the position detector which detects swing amounts of the measurement arm, it is not necessary to provide a dedicated speed detector for detecting a switching speed of the measurement arm. Thus, a compact speed control mechanism can be constructed at a low cost.

In the surface texture measuring apparatus, the detection unit may comprise a position detector disposed along a swing range of the measurement arm, configured to output pulse signals corresponding to the swing amounts of the measurement arm, the posture switching mechanism may comprise a voice coil configured to urge the measurement arm in the one swing direction or the other swing direction with the axis of rotation as the supporting point, and the speed control mechanism may comprise a signal output module configured to calculate the switching speed of the measurement arm based on the pulse signals supplied from the position detector and to output such a control signal that the measurement arm is given a switching speed that is equal to a preset instruction speed, and a constant current circuit configured to generate a current to flow through the voice coil based on the control signal supplied from the signal output module.

With this configuration, when the urging direction of the tip of the measurement arm is switched from one swing direction to the other by the relative movement mechanism, pulse signals are output from the position detector corresponding to a swing amount of the measurement arm. The computation controller calculates a current switching speed of posture switching of the measurement arm based on the pulse signals supplied from the position detector, and generates such a control signal that the measurement arm is given a switching speed that is equal to a preset instruction speed. The constant current circuit generates a current to flow through the voice coil is controlled based on the control signal supplied from the calculation controller. In this manner, the switching speed of the measurement arm can be kept equal to the instruction speed. Since the switching speed of the measurement arm can be kept at an arbitrary instruction speed, it can be set at a speed that is suitable for the material of a subject of measurement and other factors.

Furthermore, since the speed control mechanism uses pulse signals supplied from the position detector which detects swing amounts of the measurement arm, it is not necessary to provide a dedicated speed detector for detecting a switching speed of the measurement arm. Thus, a compact speed control mechanism can be constructed at a low cost.

DETAILED DESCRIPTION

Configuration of Surface Texture Measuring Apparatus

FIGS. 1-4

Figure 1:
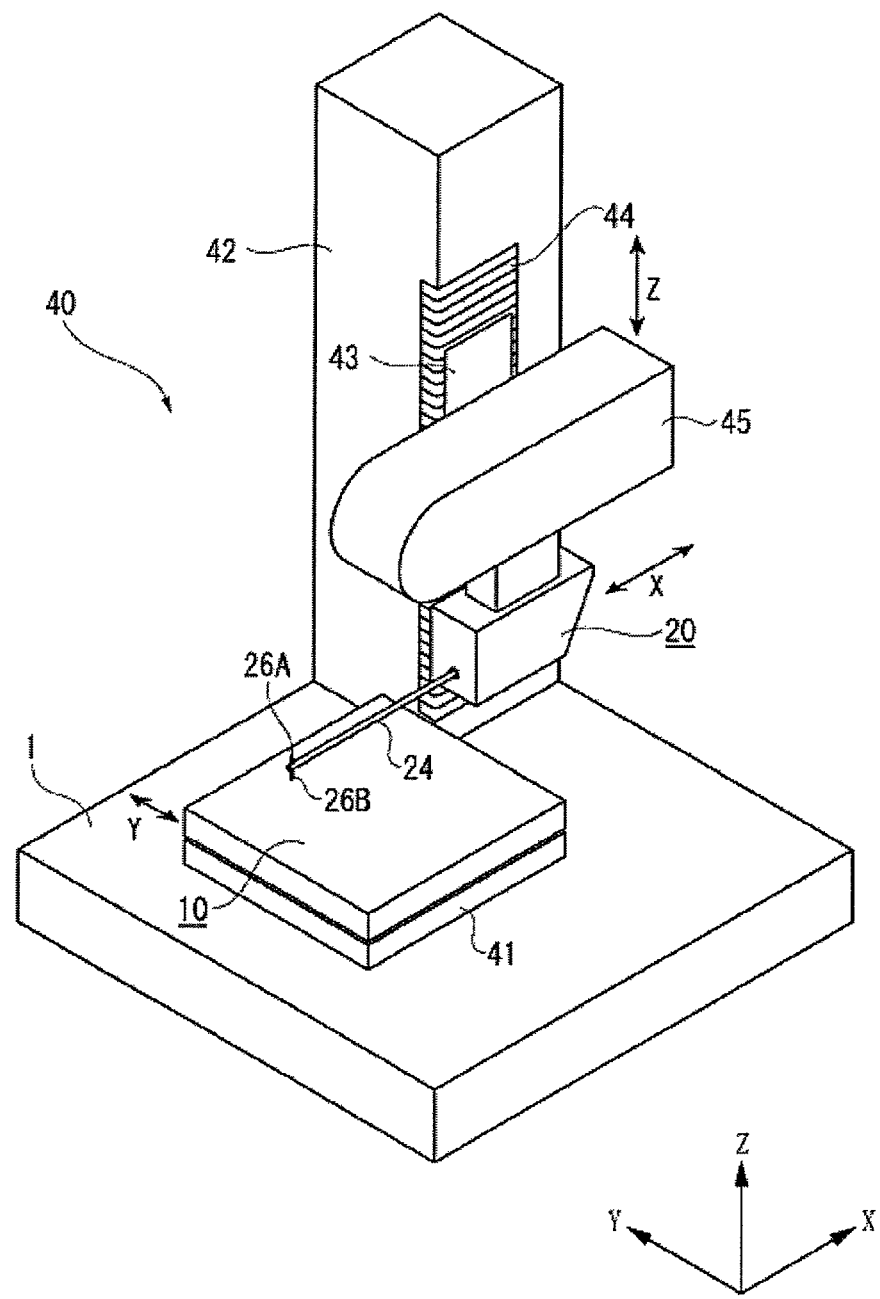
FIG. 1 is a perspective view of a surface texture measuring apparatus according to an embodiment of the present invention.

As shown in FIG. 1, a surface texture measuring apparatus according to an embodiment is equipped with a base 1, a stage 10, a stylus displacement detector 20, and a relative movement mechanism 40. The stage 10 is placed on the base 1 and is to be mounted with a subject of measurement on its top surface. The stylus displacement detector 20 has styli 26A and 26B to be brought into contact with a surface of a subject of measurement. The relative movement mechanism 40 causes a relative movement between the stylus displacement detector 20 and the stage 10.

The relative movement mechanism 40 is equipped with a Y-axis drive mechanism 41, a column 42, a Z slider 43, a Z-axis drive mechanism 44, and an X-axis drive mechanism 45. The Y-axis drive mechanism 41 is disposed between the base 1 and the stage 10 and moves the stage 10 in one horizontal direction (Y-axis direction). The column 42 is erected from the top surface of the base 1. The Z slider 43 is attached to the column 42 to as to be movable in the vertical direction (Z-axis direction). The Z-axis drive mechanism 44 elevates and lowers the Z slider 43 in the vertical direction. The X-axis drive mechanism 45 is attached to the Z slider 43 and moves the stylus displacement detector 20 in the direction (X-axis direction) that is perpendicular to the movement direction (Y-axis direction) of the stage 10 and the elevation/lowering direction (Z-axis direction) of the Z slider 43. As such, the relative movement mechanism 40 is a three-dimensional moving mechanism including the Y-axis drive mechanism 41 for moving the stage 10 in the Y-axis direction, the Z-axis drive mechanism 44 for moving the stylus displacement detector 20 in the Z-axis direction, and the X-axis drive mechanism 45 for moving the stylus displacement detector 20 in the X-axis direction.

Although not shown in FIG. 1, each of the Y-axis drive mechanism 41 and the Z-axis drive mechanism 44 has, for example, feed screw mechanism including a ball screw shaft and a nut member that is threadedly engaged with the ball screw shaft.

Figure 2:
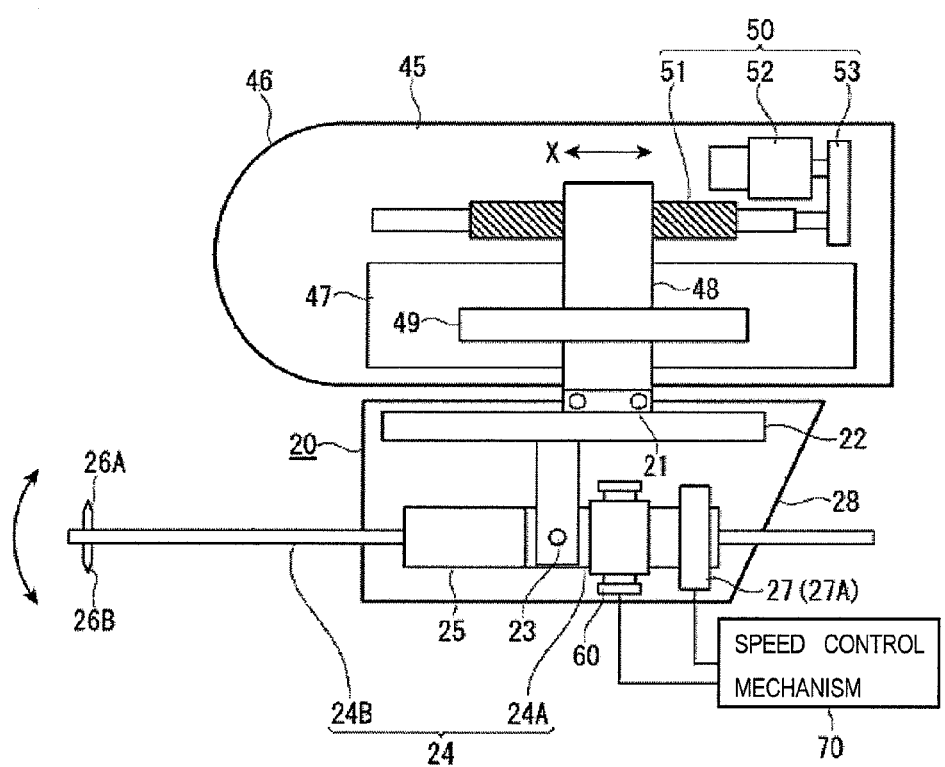
FIG. 2 is a view showing an X-axis drive mechanism and a stylus displacement detector in the embodiment.

As shown in FIG. 2, the X-axis drive mechanism 45 is equipped with a drive mechanism body 46, a guide rail 47, an X slider 48, an X-axis position detector 49, and a feed mechanism 50. The drive mechanism body 46 is fixed to the Z slider 43. The guide rail 47 is disposed in the drive mechanism body 46 so as to be parallel with the X-axis direction. The X slider 48 is disposed so as to be movable along the guide rail 47, that is, in the X-axis direction. The X-axis position detector 49 detects a position of the X-slider 48 in the X-axis direction. The feed mechanism 50 moves the X-slider 48 along the guide rail 47.

The feed mechanism 50 is composed of a feed screw shaft 51, a motor 52 as a drive source, and a rotational power transmission mechanism 53. The feed screw shaft 51 is attached to the drive mechanism body 46 so as to be parallel with the guide rail 47 and is threadedly engaged with the X slider 48. The rotational power transmission mechanism 53 transmits rotational power of the motor 52 to the feed screw shaft 51. For example, the rotational power transmission mechanism 53 is composed of a gear train, a belt, a pulley, and other components.

As shown in FIG. 2, the stylus displacement detector 20 includes a bracket 22, a measurement arm 24, a pair of styli 26A and 26B, a detection unit 27, and a casing 28. The bracket 22 is detachably supported by (hung from) the X slider 48 via bolts 21. The measurement arm 24 is supported by the bracket 22 so as to be able to swing in the vertical direction about an axis of rotation 23 (supporting point). The pair of styli 26A and 26B are provided at the tip of the measurement arm 24. The detection unit 27 detects a swing amount of the measurement arm 24. The casing 28 covers the bracket 22, the measurement arm 24, and the detection unit 27.

The measurement arm 24 is composed of a first measurement arm 24A and a second measurement arm 24B. The first measurement arm 24A is supported by the bracket 22 so as to be able to swing in the vertical direction about the axis of rotation 23 (supporting point). The second measurement arm 24B is attached exchangeably to the tip of the first measurement arm 24A via an attachment/detachment mechanism 25.

The styli 26A and 26B project from the second measurement arm 24B in the swing direction. More specifically, the upward stylus 26A and the downward stylus 26B project from the second measurement arm 24B perpendicularly in the vertical direction.

The detection unit 27 has a position detector which is disposed along a swing range of the measurement arm 24 and outputs pulse signals in a number that corresponds to a swing amount of the measurement arm 24. For example, the detection unit 27 is equipped with a scale 27A which is attached to the casing 28 so as to extend along the swing range of the measurement arm 24 and a detection head (not shown) which is attached to the measurement arm 24 so as to be opposed to the scale 27A.

The measurement arm 24 (more specifically, the first measurement arm 24A) is provided with, at a halfway position, a measurement arm posture switching mechanism 60 (which is hereinafter referred as a posture switching mechanism 60) and a speed control mechanism 70. The posture switching mechanism 60 switches the posture of the measurement arm 24 between a posture in which the measurement arm 24 is urged in one swing direction (e.g., upward direction) and a posture in which the measurement arm 24 is urged in the other swing direction (e.g., downward direction). The speed control mechanism 70 controls the switching speed of the measurement arm 24 to a preset speed when the posture of the measurement arm 24 is switched by the posture switching mechanism 60.

Figure 3:
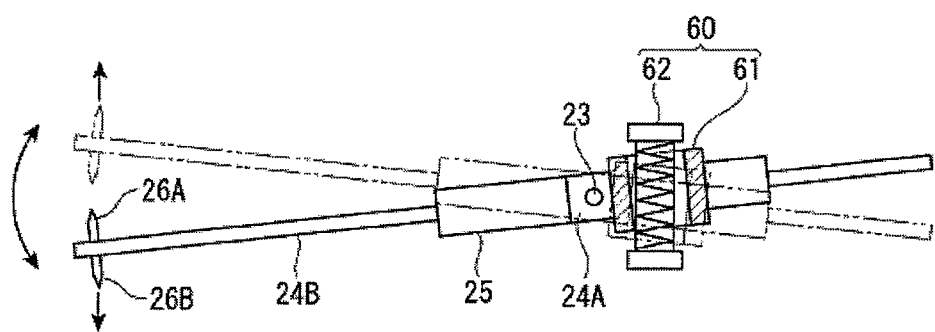
FIG. 3 is a view showing a posture switching mechanism of a measurement arm in the embodiment.

As shown in FIG. 3, the posture switching mechanism 60 is composed of a cylindrical magnet 61 and a voice coil 62. The cylindrical magnet 61 is disposed at a halfway position of the first measurement arm 24A. The voice coil 62 which is inserted in the magnet 61, is fixed to the casing 28, and serves to urge the measurement arm 24 in one swing direction (upward) and the other swing direction (downward) about the axis of rotation 23 (supporting point). Therefore, when a current flows through the voice coil 62, the voice coil 62 attracts the magnet 61 of the measurement arm 24 through the interaction between the electromagnetic force generated by the voice coil 62 and the magnetic force of the magnet 61 to cause the measurement arm 24 to take a posture in which its tip is urged upward or downward. While no current is flowing through the voice coil 62, no force for measurement is produced, that is, the weight of the first measurement arm 24A and that of the second measurement arm 24B are kept balanced with each other with the axis of rotation 23 as a supporting point.

Figure 4:
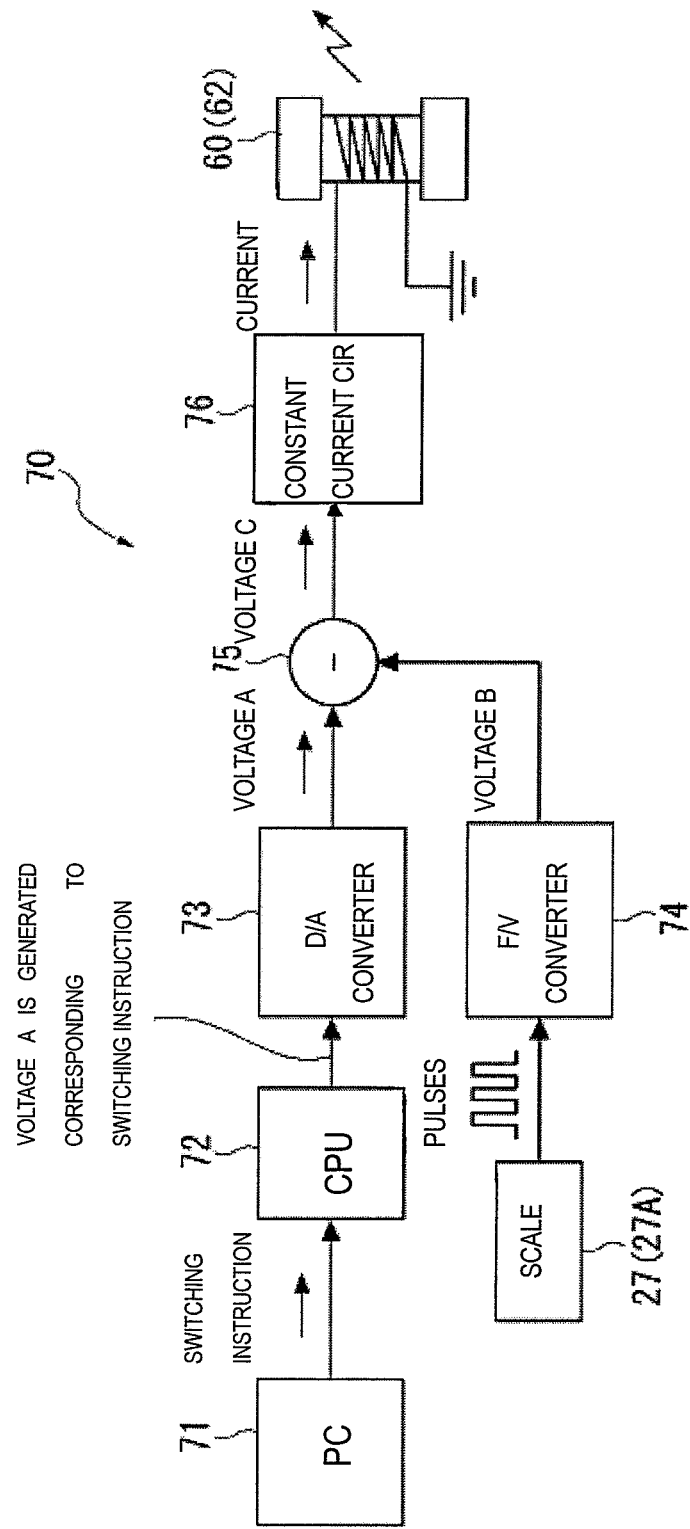
FIG. 4 is a block diagram of a speed control mechanism in the embodiment.

As shown in FIG. 4, the speed control mechanism 70 includes an instruction speed signal generator 72 (which is hereinafter referred as a signal generator 72) (e.g., CPU), a digital-to-analog converter 73, a frequency-to-voltage converter 74, a subtractor 75, and a constant current circuit 76. The signal generator generates a voltage A (instruction speed signal) corresponding to a preset speed according to a switching instruction (upward or downward switching instruction) that is output from a control apparatus 71 (e.g., personal computer (PC)). The digital-to-analog converter 73 converts the voltage A (digital signal) supplied from the signal generator 72 into an analog signal. The frequency-to-voltage converter (speed detector) 74 generates a voltage B (switching speed signal) corresponding to a switching speed of posture switching of the measurement arm 24 based on pulse signals (representing a frequency) supplied from the detection unit 27. The subtractor (difference output module) 75 outputs a difference voltage C between the instruction speed signal (voltage A) and the switching speed signal (voltage B). The constant current circuit 76 converts the difference voltage C supplied from the subtractor 75 into a current and gives the current to the voice coil 62 of the posture switching mechanism 60. The voltage A (instruction speed signal) which is generated by the signal generator 72 is set so as to represent such a speed that the stylus 26A or 26B or a subject of measurement is not damaged when the stylus 26A or 26B is brought into contact with the subject of measurement.

Measurement Example-1

Figure 5:
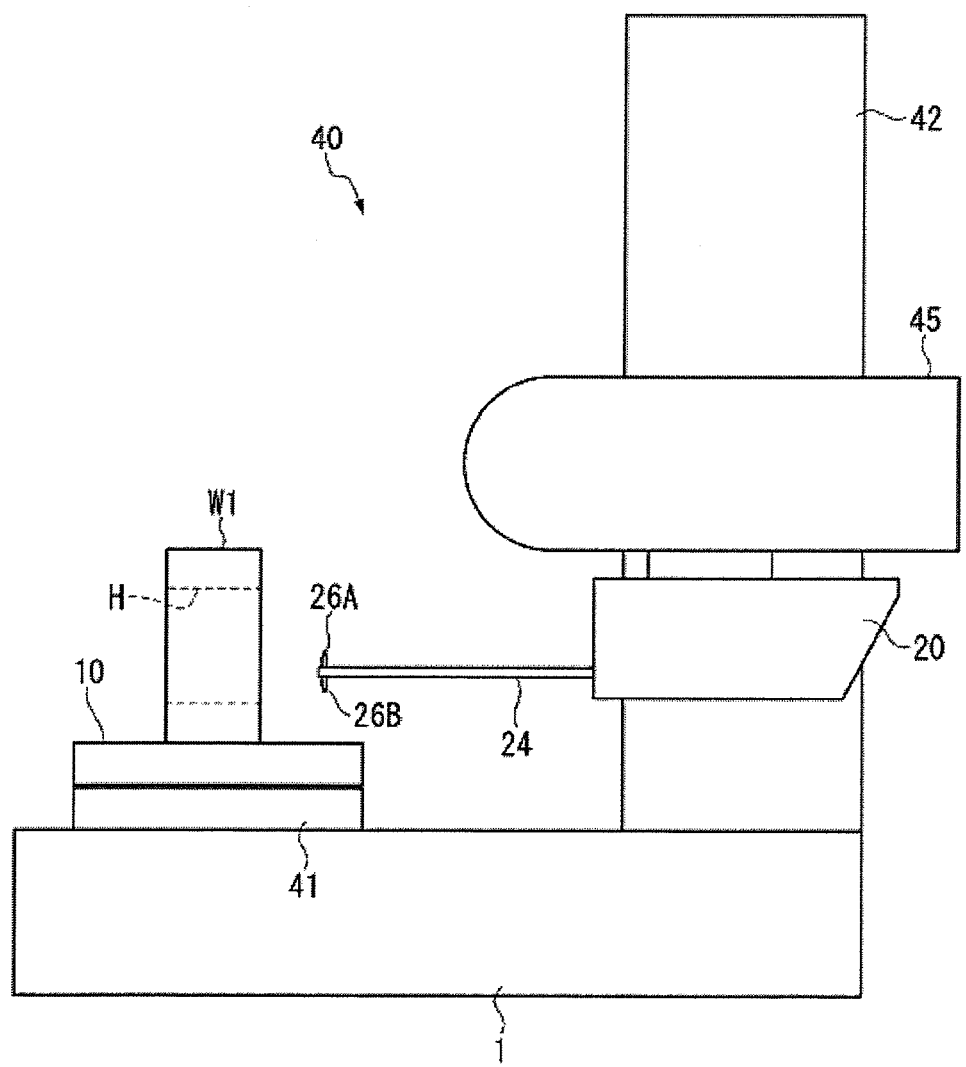
FIG. 5 is a view showing a state that an inner surface of a hole is measured in the first embodiment.
Figure 6:
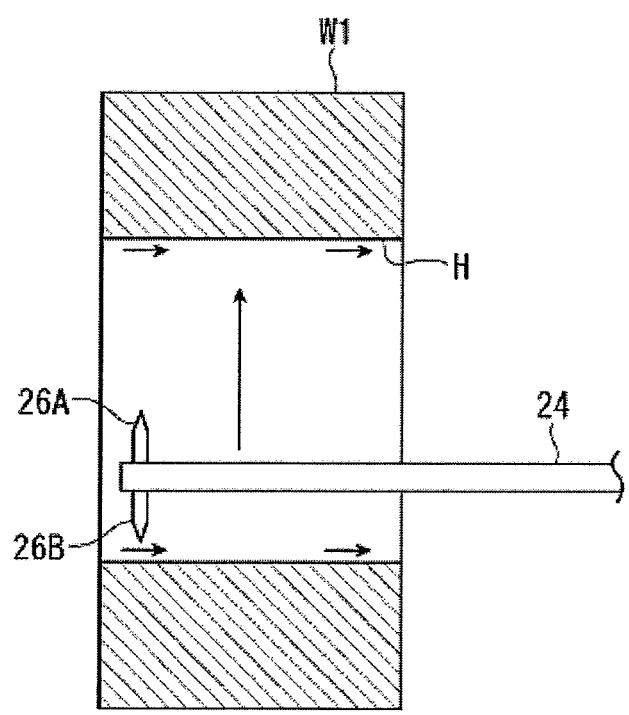
FIG. 6 is an enlarged view showing how the inner surface of the hole is measured.

FIGS. 5 and 6

Measurement example-1 is an example in which the inner surface of a hole H of a subject of measurement W1 is measured.

As shown in FIG. 5, the subject of measurement W1 is placed on the stage 10. Then, the styli 26A and 26B of the measurement arm 24 are placed inside the hole H of the subject of measurement W1 by driving the relative movement mechanism 40. Then, the posture of the measurement arm 24 is switched by the posture switching mechanism 60 so that the tip of the measurement arm 24 is urged downward, for example, whereby the downward stylus 26B is brought into contact with the bottom surface of the hole H (see FIG. 6).

In this state, as the relative movement mechanism 40 causes a relative movement between the stylus displacement detector 20 and the stage 10 in the axial direction of the hole H (X-axis direction), the detection unit 27 detects swing amounts of the measurement arm 24. A surface texture of the bottom surface of the hole H is recognized based on the detected swing amounts.

Then, the posture of the measurement arm 24 is switched by the posture switching mechanism 60 so that the tip of the measurement arm 24 is urged upward, whereby the upward stylus 26A is brought into contact with the top surface of the hole H. When the posture of the measurement arm 24 is switched, that is, when its urging direction is changed from downward to upward, the switching speed of the posture switching of the measurement arm 24 is controlled to a preset speed by the speed control mechanism 70.

More specifically, when the posture of the measurement arm 24 is switched by the posture switching mechanism 60 so that the tip of the measurement arm 24 is urged upward, pulse signals are output from the detection unit 27 in a number corresponding to a swing amount of the measurement arm 24. The frequency-to-voltage converter 74 (speed detector) generates a voltage B which corresponds to a switching speed of the measurement arm 24 based on the pulse signals supplied from the detection unit 27. A difference voltage C between the voltage B and a voltage A which corresponds to an instruction speed signal supplied from the signal generator 72 is determined, and the current to flow through the voice coil 62 is controlled based on the difference voltage C. In this manner, the switching speed of the measurement arm 24 can be kept equal to the instruction speed indicated by the instruction speed signal that is output from the signal generator 72.

Since the switching speed of the measurement arm 24 can be made lower than or equal to a prescribed speed, the impact that occurs when the stylus 26A or 26B collides with the inner surface of the hole H can be suppressed and hence the damage of the stylus 26A or 26B and the subject of measurement W1 can be made small.

Since the switching speed of the measurement arm 24 can be kept at an arbitrary instruction speed, it can be set at a speed that is suitable for the material of the subject of measurement W1 and other factors.

Furthermore, since the speed control mechanism 70 uses a swing amount of the measurement arm 24, that is, pulse signals supplied from the detection unit 27 which detects displacements of the stylus 26A or 26B, it is not necessary to provide a dedicated speed detector for detecting a switching speed of the measurement arm 24. Thus, a compact speed control mechanism 70 can be constructed at a low cost.

Then, as the relative movement mechanism 40 causes a relative movement between the stylus displacement detector 20 and the stage 10 in the axial direction of the hole H (X-axis direction), the detection unit 27 detects swing amounts of the measurement arm 24. A surface texture of the top surface of the hole H is recognized based on the detected swing amounts.

Measurement Example-2

FIG. 7

Measurement example-2 is an example in which a measurement is performed on a subject of measurement W2 which is a ball bearing.

Figure 7:
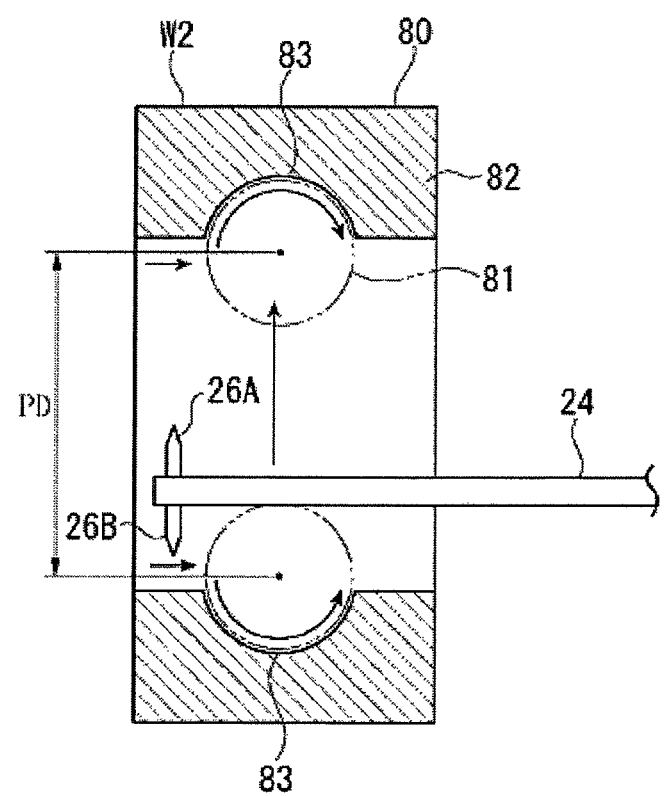
FIG. 7 is a view showing how the inner diameter of a bearing is measured in the embodiment.

As shown in FIG. 7, in a ball bearing 80 (composed of balls 81 and a ring-shaped holder 82 which holds the balls 81), the inner circumferential surface of the holder 82 is formed with a ball containing groove 83 which is convex in cross section and the balls 81 are held in the ball containing groove 83. In order to evaluate the ball bearing 80, it is necessary to measure the diameter PD of a pitch circle that connects the centers of the balls 81 which are contained in the ball containing groove 83.

In this case, a lower convex surface of the ball containing groove 83 is measured in the same manner as in measurement example-1 and the center of the lower convex surface is determined based on measurement results. Then, the urging direction of the measurement arm 24 is switched to upward and an upper lower convex surface of the ball containing groove 83 is measured. The center of the upper convex surface is determined based on measurement results. The distance between the two centers is determined as the diameter PD of a pitch circle that connects the centers of the balls 81 which are contained in the ball containing groove 83.

Measurement Example-3

Figure 8:
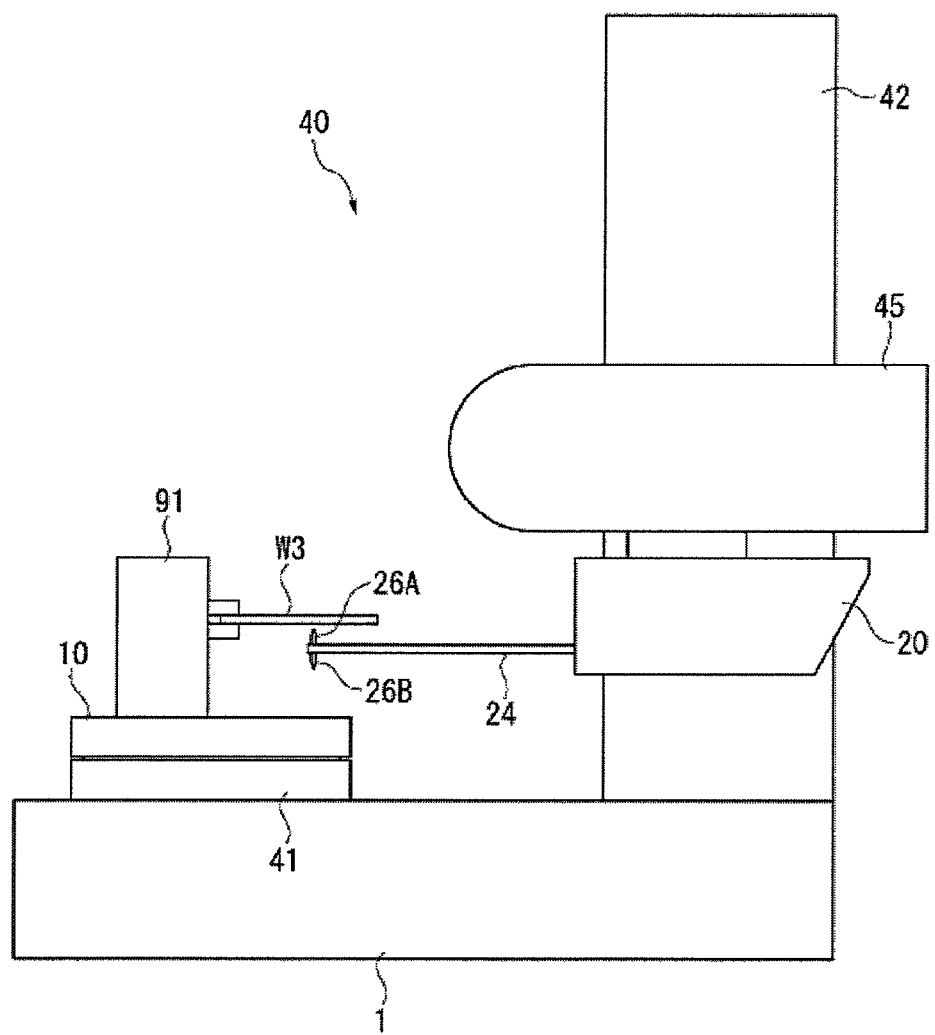
FIG. 8 is a view showing how a thickness is measured in the embodiment.
Figure 9:
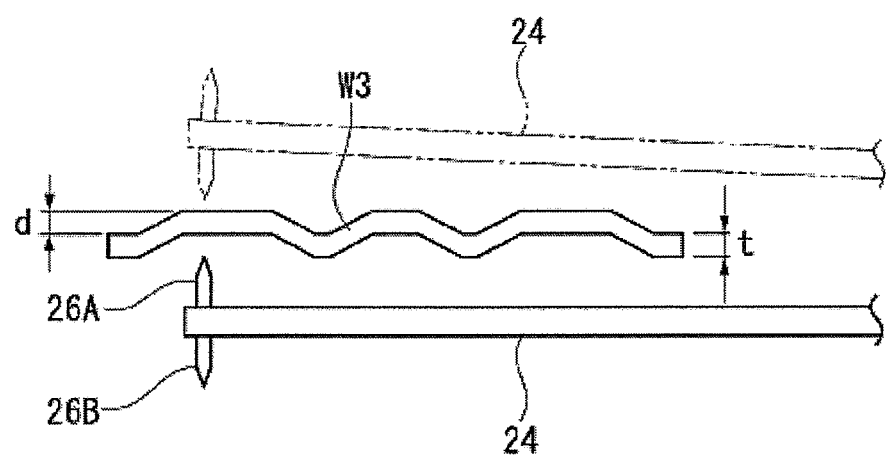
FIG. 9 is an enlarged view showing how a thickness is measured in the embodiment.

FIGS. 8 and 9

Measurement example-3 is an example in which a thickness of a plate-like subject of measurement W3 is measured.

As shown in FIG. 8, the subject of measurement W3 is placed on the stage 10 via a fixing jig 91. Then, the styli 26A and 26B of the measurement arm 24 are moved so as to be located below the bottom surface of the subject of measurement W3 by driving the relative movement mechanism 40. Then, the posture of the measurement arm 24 is switched by the posture switching mechanism 60 so that the tip of the measurement arm 24 is urged upward, for example, whereby the upward stylus 26A is brought into contact with the bottom surface of the subject of measurement W3 (see FIG. 9).

In this state, as the relative movement mechanism 40 causes a relative movement between the stylus displacement detector 20 and the stage 10 in the X-axis direction, the detection unit 27 detects swing amounts of the measurement arm 24. A surface texture of the bottom surface of the subject of measurement W3 is recognized based on the detected swing amounts.

Then, the styli 26A and 26B of the measurement arm 24 are moved so as to be located above the top surface of the subject of measurement W3 by driving the relative movement mechanism 40. Then, the posture of the measurement arm 24 is switched by the posture switching mechanism 60 so that the tip of the measurement arm 24 is urged downward, whereby the downward stylus 26B is brought into contact with the top surface of the subject of measurement W3. In this state, as the relative movement mechanism 40 causes a relative movement between the stylus displacement detector 20 and the stage 10 in the X-axis direction, the detection unit 27 detects swing amounts of the measurement arm 24. A surface texture of the top surface of the subject of measurement W3 is recognized based on the detected swing amounts.

A thickness t, a step height d, etc. of the subject of measurement W3 can be determined correctly based on the measured surface texture of the bottom surface and the top surface of the subject of measurement W3.

Modifications

FIG. 10

The invention is not limited to the above embodiment and encompasses modifications, improvements, etc. as long as they can attain the object of the invention.

Figure 10:
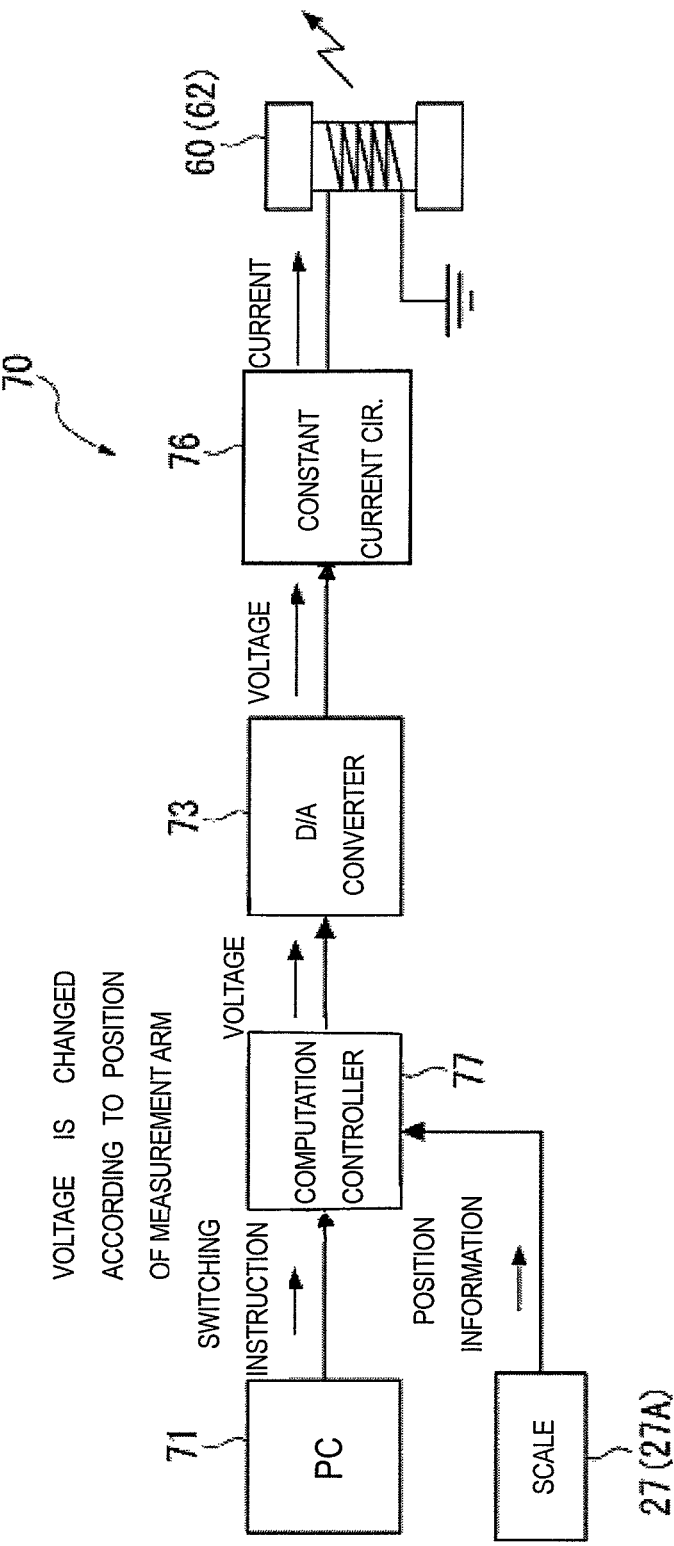
FIG. 10 is a block diagram of a speed control mechanism according to a modification of the embodiment.
Figure 11:
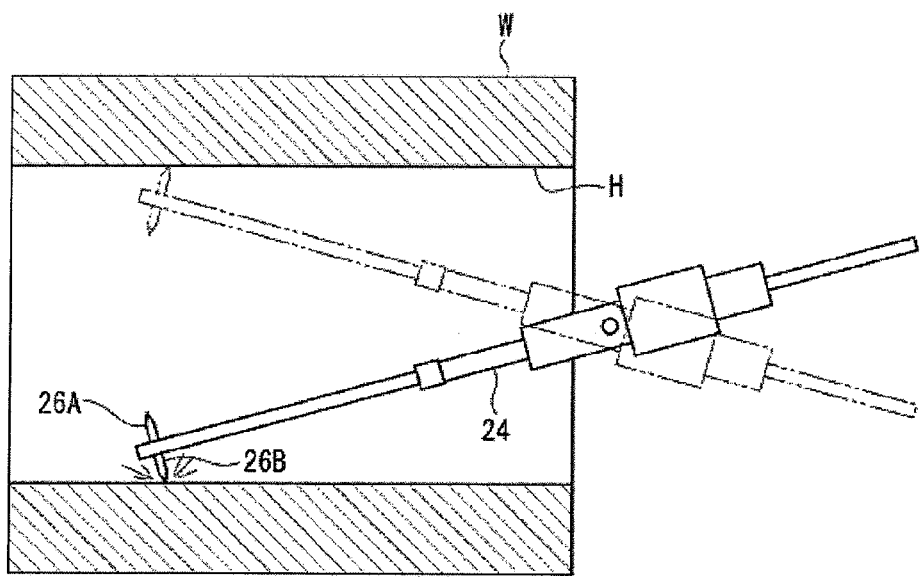
FIG. 11 is a view showing a problem of a conventional posture switching mechanism of a measurement arm.

For example, the configuration of the speed control mechanism 70 is not limited to the one used in the embodiment. For example, as shown in FIG. 10, the speed control mechanism 70 may be composed of a computation controller 77, a digital-to-analog converter 73, and a constant current circuit 76. The computation controller 77 calculates a switching speed of posture switching of the measurement arm 24 based on pulse signals (position information) supplied from the detection unit 27 and generates such a voltage (control signal) that the switching speed is kept at a preset instruction speed. The digital-to-analog converter 73 converts the voltage (control signal) supplied from the computation controller 77 into an analog signal. The constant current circuit 76 generates a current to flow through the voice coil 62 based on the output of the digital-to-analog converter 73.

With the above configuration, when the posture of the measurement arm 24 is switched from a posture in which it is urged in one swing direction to a posture in which it is urged in the other swing direction, pulse signals (position information) are output from the detection unit 27 in a number corresponding to a swing amount of the measurement arm 24. The computation controller 77 measures an elapsed time from a start of the movement, calculates a current switching speed of the measurement arm 24 which is performing the posture switching based on the measured elapsed time and the pulse signals (position information) from the detection unit 27. Then, the computation controller 77 compares the calculated switching speed with an instruction speed indicated by a switching instruction supplied from the control apparatus 71, and generates such a voltage (control signal) that the switching speed is made equal to the instruction speed. Since the constant current circuit 76 generates a current to flow through the voice coil 62 based on the control signal supplied from the computation controller 77, the switching speed of the measurement arm 24 can be kept at the instruction speed. It is expected that the modification provides the same advantages as the embodiment does.

Although in the embodiment the posture switching mechanism 60 includes the voice coil 62 for urging the measurement arm 24 in one swing direction or the other about the axis of rotation 23 (supporting point), it may use a linear motor mechanism, for example.

The swing direction is not limited to the vertical direction and may be a horizontal direction or an oblique direction.

Although in the embodiment the styli 26A and 26B project from the measurement arm 24 perpendicularly in the vertical direction, the invention is not limited to such a case. The styli 26A and 26B may project in directions that are inclined from the direction that is perpendicular to the measurement arm 24. The projection angle is not limited as long as the styli 26A and 26B have considerable components projecting in the swing direction of the measurement arm 24.

In the embodiment, the pressure (measurement pressure) at which the stylus 26A or 26B contacts a subject of measurement depends on the current flowing through the voice coil 62. Therefore, the control apparatus 71 may issue, in addition to a switching instruction (upward or downward switching instruction), an instruction indicating an arbitrary switching speed being equal to or lower than a speed that does not cause damage to the stylus 26A or 26B or a subject of measurement to adjust pressure (measurement pressure) at which the stylus 26A or 26B contacts the subject of measurement. This makes it possible to perform a measurement at a measurement pressure that is most suitable for the material of a subject of measurement.

Although in the embodiment the relative movement mechanism 40 moves the stage 10 in the Y-axis direction and moves the stylus displacement detector 20 in the X-axis direction and the Z-axis direction, the invention is not limited to such a case. In essence, either the stage 10 or the stylus displacement detector 20 may be moved as long as they can be moved relative to each other in three dimensions.

For example, the invention can be applied to automatic measurement of a surface texture of an inner surface of a hole and the thickness of a plate-like subject of measurement.

What is claimed is:

1. A surface texture measuring apparatus for measuring a surface texture of a subject of measurement based on swing amounts of a measurement arm, said apparatus comprising:

a detector having a pair of styli and further having the measurement arm supported so as to be able to swing with an axis of rotation as a supporting point, and a detection unit configured to detect the swing amounts of the measurement arm;

a posture switching mechanism configured to switch a posture of the measurement arm between a posture in which the measurement arm is swung in one measurement direction and a posture in which the measurement arm is swung in another measurement direction; and a speed control mechanism configured to control a switching speed of posture switching of the measurement arm to a preset speed when the posture of the measurement arm is switched by the posture switching mechanism, wherein:

each stylus of the pair of styli projects opposite each other from a tip of the measurement arm in a said measurement direction of the measurement arm.

2. The surface texture measuring apparatus according to claim 1, further comprising:

a stage configured to mount the subject of measurement thereon; and a relative movement mechanism configured to cause a relative movement between the detector and the stage, wherein:

the detection unit detects the swing amounts of the measurement arm while the relative movement mechanism causes a relative movement between the detector and the stage in a state that one of the pair of styli is in contact with a surface of the subject of measurement.

3. The surface texture measuring apparatus according to claim 1, wherein:

the detection unit comprises a position detector disposed along a swing range of the measurement arm, configured to output pulse signals corresponding to the swing amounts of the measurement arm, the posture switching mechanism comprises a voice coil configured to swing the measurement arm in the one measurement direction or the another measurement direction with the axis of rotation as the supporting point, and the speed control mechanism comprises a speed detector configured to detect the switching speed of the measurement arm based on the pulse signals supplied from the position detector, a signal generator configured to generate an instruction speed signal indicating an instruction speed corresponding to a switching direction, a difference output module configured to output a difference between the instruction speed and the switching speed, and a constant current circuit configured to generate a current to flow through the voice coil based on the difference supplied from the difference output module.

4. The surface texture measuring apparatus according to claim 1, wherein:

the detection unit comprises a position detector disposed along a swing range of the measurement arm, configured to output pulse signals corresponding to the swing amounts of the measurement arm, the posture switching mechanism comprises a voice coil configured to swing the measurement arm in the one measurement direction or the another measurement direction with the axis of rotation as the supporting point, and the speed control mechanism comprises a signal output module configured to calculate the switching speed of the measurement arm based on the pulse signals supplied from the position detector and to output such a control signal that the measurement arm is given a switching speed that is equal to a preset instruction speed, and a constant current circuit configured to generate a current to flow through the voice coil based on the control signal supplied from the signal output module.

5. The surface texture measuring apparatus according to claim 1, wherein the speed control mechanism comprises:

a speed detector configured to detect the switching speed of the measurement arm;

a signal generator configured to generate an instruction speed signal indicating an instruction speed corresponding to a switching direction of the measurement arm between the one measurement direction and the another measurement direction; and a difference outputter configured to output a difference between the instruction speed and the switching speed to a constant current circuit.

6. The surface texture measuring apparatus according to claim 1, wherein:

in the one measurement direction, the measurement arm measures the surface texture of the subject of measurement; and in the another measurement direction, which is a direction opposite the one measurement direction, the measurement arm measures the surface texture of the subject of measurement.

* * * * *